(12) United States Patent
Hoetzendorfer

(10) Patent No.: US 10,597,047 B2
(45) Date of Patent: Mar. 24, 2020

(54) METHOD AND TRANSPORT VEHICLE FOR LOADING AND UNLOADING

(71) Applicant: PLASSER & THEURER EXPORT VON BAHNBAUMASCHINEN GESELLSCHAFT M.B.H., Vienna (AT)

(72) Inventor: Patrick Hoetzendorfer, Engerwitzdorf (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 0 days.

(21) Appl. No.: 16/091,195

(22) PCT Filed: Mar. 8, 2017

(86) PCT No.: PCT/EP2017/000308
§ 371 (c)(1),
(2) Date: Oct. 4, 2018

(87) PCT Pub. No.: WO2017/174171
PCT Pub. Date: Oct. 12, 2017

(65) Prior Publication Data
US 2019/0111947 A1    Apr. 18, 2019

(30) Foreign Application Priority Data

Apr. 5, 2016 (AT) .................. A 176/2016

(51) Int. Cl.
*B61D 15/02* (2006.01)
*E01B 27/00* (2006.01)
(Continued)

(52) U.S. Cl.
CPC .............. *B61D 15/02* (2013.01); *B61D 3/182* (2013.01); *B65G 41/002* (2013.01);
(Continued)

(58) Field of Classification Search
CPC ......... B61D 3/182; B61D 15/02; E01B 27/00; B61G 5/00; B65G 65/02; B65G 67/08; B65G 67/10; B65G 41/02; B65G 41/007; B65G 41/008; B61F 5/36
See application file for complete search history.

(56) References Cited

U.S. PATENT DOCUMENTS 3,494,299 A     2/1970 Boyer
4,809,617 A *   3/1989 Theurer .................. E01B 27/02
                                              105/239
(Continued)

FOREIGN PATENT DOCUMENTS

DE   1759235 A1   6/1971
EP   0490868 A1   6/1992
(Continued)

*Primary Examiner* — Mark A Deuble
(74) *Attorney, Agent, or Firm* — Laurence A. Greenberg; Werner H. Stemer; Ralph E. Locher

(57) ABSTRACT

A transport vehicle includes a container for receiving bulk material which is disposed on a vehicle frame and is pivoted, together with a bottom conveyor belt and a third conveyor belt, relative to the vehicle frame about a pivot axis extending in a longitudinal direction of the vehicle in order to maintain a horizontal conveying plane, relative to a transverse direction of the vehicle, for the bottom conveyor belt and the third conveyor belt, independently of a transverse inclination of the track. Thus, a problem-free bulk material transport is possible even in the event of a transverse inclination of the track. A method of loading and unloading a transport vehicle which is mobile on a track is also provided.

3 Claims, 1 Drawing Sheet

(51) Int. Cl.
  *B65G 41/02* (2006.01)
  *B65G 41/00* (2006.01)
  *B61D 3/18* (2006.01)
  *B61F 5/36* (2006.01)
  *B61G 5/00* (2006.01)
  *B65G 65/02* (2006.01)

(52) U.S. Cl.
  CPC ........... *B65G 41/007* (2013.01); *B65G 41/02* (2013.01); *E01B 27/00* (2013.01); *B61F 5/36* (2013.01); *B61G 5/00* (2013.01); *B65G 65/02* (2013.01)

(56) References Cited

U.S. PATENT DOCUMENTS

| | | | | |
|---|---|---|---|---|
| 4,923,355 A | * | 5/1990 | Mancini | E01B 27/00 104/2 |
| 5,221,172 A | | 6/1993 | Theurer et al. | |
| 5,341,746 A | * | 8/1994 | Theurer | E01B 27/00 104/2 |
| 5,364,221 A | * | 11/1994 | Theurer | B61D 3/16 414/339 |
| 5,400,718 A | * | 3/1995 | Theurer | B61D 7/06 105/239 |
| 5,993,131 A | * | 11/1999 | Theurer | B61D 15/00 104/2 |
| 6,293,415 B1 | * | 9/2001 | Franzke | B61D 15/02 105/238.1 |
| 6,425,333 B2 | | 7/2002 | Theurer et al. | |
| 2017/0120936 A1 | | 5/2017 | Hoetzendorfer | |

FOREIGN PATENT DOCUMENTS

| | | |
|---|---|---|
| EP | 1083262 A2 | 3/2001 |
| EP | 1125812 A2 | 8/2001 |
| EP | 2105533 A1 | 9/2009 |
| WO | 2015154844 A1 | 10/2015 |

* cited by examiner

METHOD AND TRANSPORT VEHICLE FOR LOADING AND UNLOADING

BACKGROUND OF THE INVENTION

Field of the Invention

The invention relates to a method of loading and unloading a transport vehicle mobile on a track, and to a transport vehicle.

According to EP 1 083 262, such a transport vehicle mobile on a track is known which has a container for receiving bulk material and a vehicle frame. A first bulk material transport is carried out on a bottom conveyor belt, extending in a longitudinal direction of the vehicle, and on a transfer conveyor belt adjoining the former and projecting beyond a vehicle end. Parallel to that, a second bulk material transport is possible on a third conveyor belt spaced from the bottom conveyor belt. This has the advantage that—parallel to emptying the transport vehicles—a filling of the same can also take place.

SUMMARY OF THE INVENTION

It is the object of the present invention to provide a method and a transport vehicle of the kind mentioned at the beginning with which an improvement of the bulk material transport is possible.

According to the invention, this object is achieved with a method of the specified type in that the container together with the bottom conveyor belt and the third conveyor belt is pivoted relative to the vehicle frame about an axis extending in the longitudinal direction of the vehicle in order to maintain a horizontal conveying plane—with regard to a transverse direction of the vehicle—for all of the conveyor belts independently of a transverse inclination of the track.

With such a pivoting of the entire transport unit, it is possible to maintain a horizontal transport plane of the conveyor belts even in a track curve despite the transverse inclination. Thus, a disadvantageous concentration of the bulk material masses in the direction towards the lower-lying rail can be reliably avoided both in the container as well as on the third conveyor belt.

A transport vehicle designed according to the invention is characterized in that the container together with the bottom conveyor belt and the third conveyor belt is designed to be pivotable relative to the vehicle frame by means of a pivot drive about a pivot axis extending in the longitudinal direction of the vehicle.

With such a pivoting of the container, which can be realized with relatively simple structure, a structurally much more expensive pivoting of the total of three conveyor belts becomes unnecessary in an advantageous way.

Additional advantages of the invention become apparent from the dependent claims and the drawing description.

BRIEF DESCRIPTION OF THE SEVERAL VIEWS OF THE DRAWING

The invention will be described in more detail below with reference to an embodiment represented in the drawing in which.

DESCRIPTION OF THE INVENTION

Figure 1:
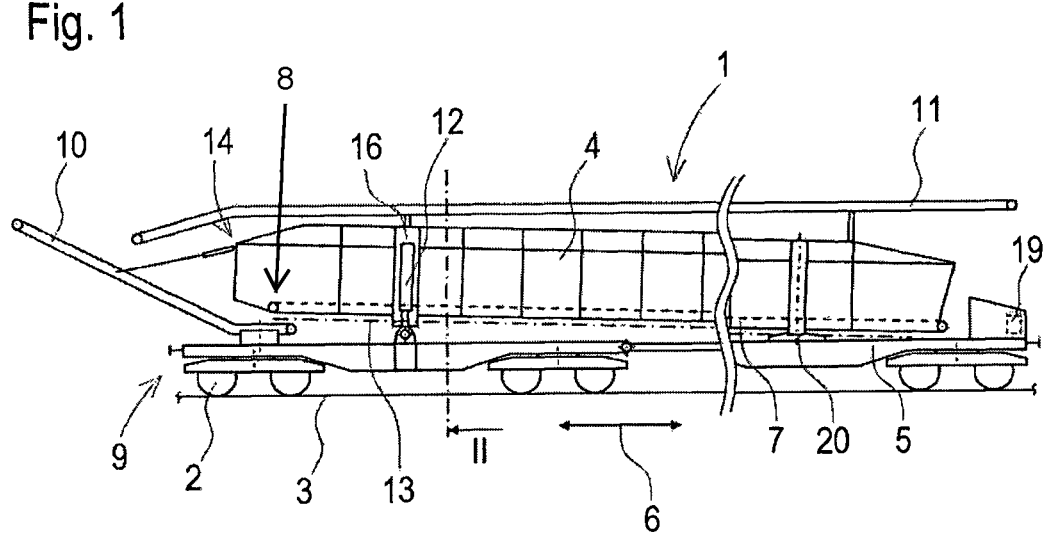
FIG. 1 shows a side view of a transport vehicle provided for the transport of bulk material.

A transport vehicle 1 shown in FIG. 1 has a vehicle frame 5 which is mobile by means of on-track undercarriages 2 on a track 3 and is connected to a container 4 for receiving bulk material. Arranged in place of a bottom surface in the container 4 is a bottom conveyor belt 7 extending in a longitudinal direction 6 of the vehicle. A transfer conveyor belt 10, designed inclined and projecting beyond a wagon end 9, is associated with said bottom conveyor belt 7 at a front end 8 with regard to the transport direction.

Additionally, a third conveyor belt 11 which is spaced from the bottom conveyor belt 7 and extends in the longitudinal direction 6 of the vehicle is connected to an upper end of the container 4. Thus, a first bulk material transport can be carried out on the bottom—and transfer conveyor belt 7, 10 and, parallel thereto, an independent second bulk material transport can be carried out on the third conveyor belt 11. Transport vehicles 1 designed in this manner are often arranged one following the other to form a transport train, wherein the bulk material can be transported through via the connected transport paths (see EP 1 083262).

Figure 2:
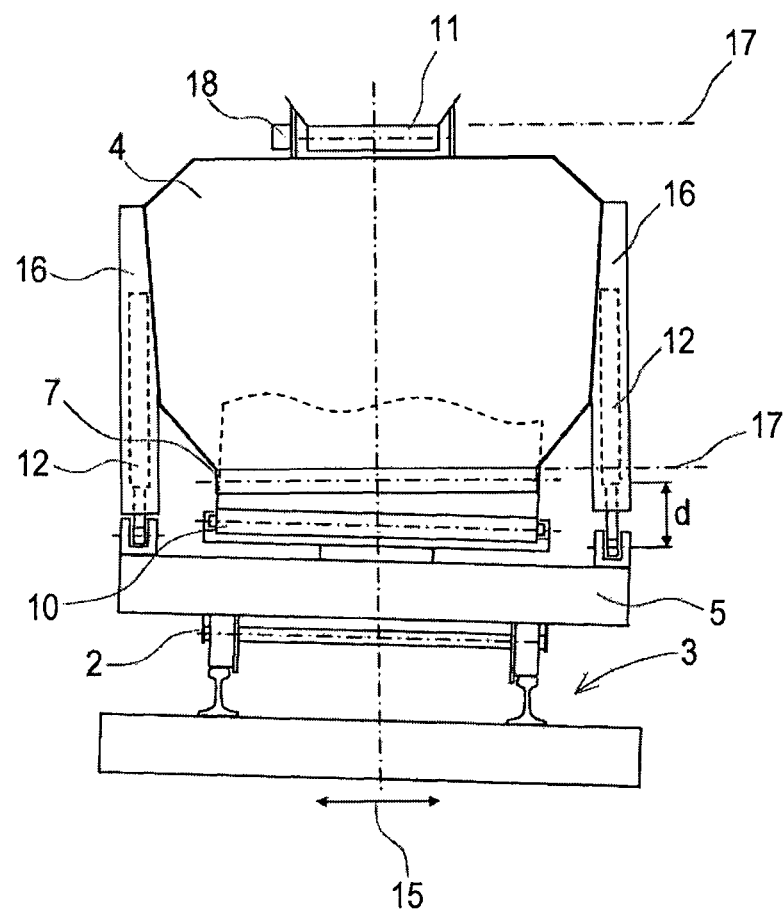
FIG. 2 shows a simplified cross-section of the transport vehicle according to section line II in FIG. 1.

As can be seen particularly in FIG. 2, the container 4 together with the bottom conveyor belt 7 and the third conveyor belt 11 is pivotable relative to the vehicle frame 5 about a pivot axis 13, extending in the longitudinal direction 6 of the vehicle, by means of two pivot drives 12. For this purpose, at a longitudinal end 14 adjoining the transfer conveyor belt 10, the container 4 is connected to the vehicle frame 5 by means of two container supports 16 spaced from one another in a transverse direction 15 of the vehicle. Each container support 16 is designed to be telescopically elongatable by means of the two pivot drives 12 for changing a distance d between the vehicle frame 5 and the container 4. An end of the container 4 lying opposite the longitudinal end 14 is articulatedly connected to the vehicle frame 5 via a pivot bearing 20.

Since, as is well known, in a track curve the track 3 has a transverse track inclination, the vertical fall line causes the bulk material to shift in the direction towards the lower-lying rail in the region of the bulk material transfer. This leads to an impairment of the material flow. In order to rectify this negative effect, the container 4 together with the bottom conveyor belt 7 and the third conveyor belt 11 is pivoted relative to the vehicle frame 5 about the pivot axis 13 in the direction towards the higher-lying rail with actuation of the two pivot drives 12. Thus, a horizontal conveying plane 17 with regard to the transverse direction 15 of the vehicle is ensured for the said conveyor belts 7, 11 independently of the transverse inclination of the track 3.

For an automatic pivoting of the container 4, it is advantageous if a transverse inclination measuring device 18 as well as a regulating/control device 19 connected thereto are provided for actuation of the pivot drives 12 and a pivoting of the container 4. With this, the horizontal conveying plane 17 can be maintained independently of the transverse position of the track.

The invention claimed is:
1. A method of loading and unloading a transport vehicle being mobile on a track, the method comprising the following steps:
   providing a container for receiving bulk material;
   providing a vehicle frame associated with the container;
   carrying out a first bulk material transport on a bottom conveyor belt extending in a longitudinal direction of the vehicle and on a transfer conveyor belt adjoining the bottom conveyor belt and projecting beyond an end of the vehicle;
   carrying out a second bulk material transport, parallel to the first bulk material transport, on a third conveyor belt spaced apart from the bottom conveyor belt; and pivoting the container together with the bottom conveyor belt and the third conveyor belt relative to the vehicle frame about a pivot axis extending in the longitudinal direction of the vehicle for maintaining a horizontal conveying plane, relative to a transverse direction of the vehicle, for the bottom conveyor belt and the third conveyor belt, independently of a transverse inclination of the track.

2. A transport vehicle, comprising:
on-track undercarriages;
a container for receiving bulk material;
a vehicle frame being mobile on said on-track undercarriages and being connected to said container;
a bottom conveyor belt extending in a longitudinal direction of the vehicle and having a front end;
a transfer conveyor belt being associated with said bottom conveyor belt at said front end of said bottom conveyor belt, said transfer conveyor belt being inclined and projecting beyond an end of the vehicle;
a third conveyor belt spaced apart from said bottom conveyor belt and extending in the longitudinal direction of the vehicle;
a pivot drive for pivoting said container together with said bottom conveyor belt and said third conveyor belt relative to said vehicle frame about a pivot axis extending in the longitudinal direction of the vehicle; and
a transverse inclination measuring device and a regulating/control device being connected to said transverse inclination measuring device for actuating said pivot drive and pivoting said container to maintain a horizontal conveying plane relative to a transverse direction of the vehicle.

3. A transport vehicle, comprising:
on-track undercarriages;
a container for receiving bulk material, said container having a longitudinal end;
a vehicle frame being mobile on said on-track undercarriages and being connected to said container;
a bottom conveyor belt extending in a longitudinal direction of the vehicle and having a front end;
a transfer conveyor belt being associated with said bottom conveyor belt at said front end of said bottom conveyor belt, said transfer conveyor belt being inclined and projecting beyond an end of the vehicle, said longitudinal end of said container adjoining said transfer conveyor belt;
a third conveyor belt spaced apart from said bottom conveyor belt and extending in the longitudinal direction of the vehicle;
a pivot drive for pivoting said container together with said bottom conveyor belt and said third conveyor belt relative to said vehicle frame about a pivot axis extending in the longitudinal direction of the vehicle;
two container supports connecting said longitudinal end to said vehicle frame;
said container supports being spaced from one another in the transverse direction of the vehicle; and
each of said container supports being telescopically elongatable by said pivot drive for changing a distance between said vehicle frame and said container.

* * * * *